UNITED STATES PATENT OFFICE 2,294,286

STABILIZATION OF UNSATURATED KETONES

Hans Dannenberg, San Francisco, and David E. Adelson, Berkeley, Calif., assignors to Shell Development Company, San Francisco, Calif., a corporation of Delaware No Drawing. Application January 27, 1941, Serial No. 376,250

16 Claims. (Cl. 260—593)

This invention relates to a process for preventing or inhibiting undesirable polymerization of readily polymerizable ketones, and is also directed to the stable compositions of matter produced thereby. More particularly, the invention relates to the stabilization of normally liquid unsaturated ketones having an unsaturated group of at least three carbon atoms attached to the carbonyl group, this unsaturated group containing a terminal methylene group. The invention also provides a process whereby members of the above-defined unsaturated ketones may be stabilized against undesirable polymerization and whereby, whenever it may be desired to subject the thus stabilized ketones to polymerization, whether via homopolymerization or heteropolymerization with other compounds, the unsaturated ketones may be readily recovered from the stable mixture in a pure, substantially water-white and readily polymerizable monomeric state.

The present invention is adapted to the stabilization and preservation of all normally liquid unsaturated ketones having an unsaturated group of at least three carbon atoms attached to the carbonyl group, this unsaturated group containing a terminal methylene group. The invention, however, is particularly applicable to the stabilization of alpha-beta unsaturated ketones having an unsaturated tertiary alpha carbon atom directly attached to a terminal methylene group. The following are representative unsaturated ketones of the preferred group to which the process of this invention is particularly applicable: methyl isopropenyl ketone, ethyl isopropenyl ketone, propyl isopropenyl ketone, cyclopentyl isopropenyl ketone, allyl isopropenyl ketone, di-isopropenyl ketone, 2-ethyl-butene-1-one-3, 2-propyl-butene-1-one-3, 2-ethyl-pentene-1-one-3, and the like, and their homologues and analogues, as well as suitable substitution products. Other unsaturated ketones which do not have the above-defined substituted vinyl group directly attached to the carbonyl group, but which fall within the defined broad class of unsaturated ketones which may be stabilized according to the present invention, include: pentene-1-one-4, hexene-1-one-4, hexene-1-one-5, 2-methyl-pentene-1-one-4, 2-ethyl-pentene-1-one-4, 2-propyl-pentene-1-one-4, 2-methyl-hexene-1-one-4, 2-methyl-hexene-1-one-5, and the like, and their homologues and analogues, and suitable substitution products. For instance, the present process may be extended to the stabilization of the above type of unsaturated ketones in which one or more of the hydrogen atoms are substituted by halogen atoms. Representative substituted ketones of this type are 2-chlor-pentene-1-one-4, 3-chlor-pentene-1-one-4, 2-bromo-pentene-1-one-4, and the like.

The above-defined unsaturated ketones, and especially the normally liquid alpha-beta unsaturated ketones having an unsaturated tertiary alpha carbon atom directly attached to a terminal methylene group, are very valuable chemical compounds and find particular utility as intermediates in the production of a wide variety of different and useful products. For example, all of these ketones may be employed in the production of a large number of resins which are formed by the polymerization of a given unsaturated ketone or by polymerizing said ketone with another or with other organic compounds, such as acrylates, diolefins, vinyl halides, and the like.

Such unsaturated ketones, however, are unstable and will readily polymerize even when subjected to storage under ordinary conditions, such as temperatures in the range of 20° C. to 25° C. This uncontrolled polymerization is frequently undesirable since it is often necessary to ship the ketone monomer to distant places or to store the same for relatively long periods of time before the ketone is to be employed, for example, in the manufacture of resins. Since it is necessary to have the unsaturated ketone in a monomeric state, any uncontrolled polymerization thereof is thus undesirable because it necessitates further treatment, such as depolymerization, during which a part of the ketone remains as a polymer or is converted to other forms, thus decreasing the recoverable amount of the unsaturated ketone monomer.

Various attempts have been made to prevent or at least retard the undesirable polymerization of the above-defined class of readily polymerizable unsaturated ketones. These prior art methods, however, are generally ineffective, prohibitively costly and/or result in relatively stable mixtures or solutions which are unsuitable for further commercial use due to the difficulty of separation of the readily polymerizable unsaturated ketone monomer therefrom.

It has now been discovered that unsaturated ketones having an unsaturated radical of at least three carbon atoms attached to the carbonyl group, this unsaturated radical containing a terminal methylene group, may be readily stabilized against polymerization by incorporating ammonia thereinto. It has been further discovered that the presence of ammonia, which may be employed either as liquid or gaseous ammonia or as an aqueous ammonia solution, in the above-defined class of unsaturated ketones, and particularly in alpha-beta unsaturated ketones containing an unsaturated tertiary alpha carbon atom directly attached to a terminal methylene group, will inhibit or even prevent the aforementioned undesirable polymerization so that these unsaturated ketones may be stored for long periods of time and/or shipped to distant places without any or substantial formation of the ketone dimers and/or polymers.

The quantity of ammonia to be employed as the polymerization inhibiting agent may vary within relatively wide limits, and may depend on a number of variables such as the storage temperature, etc. However, under normal conditions, very small amounts of ammonia are sufficient to inhibit the polymerization of the defined unsaturated ketones. For example, although the ammonia may be employed in quantities as high as 2% to 5%, or more, by weight of the ketone, it was found that excellent stabilizing results may be attained when the ammonia content in the stable composition of matter thus formed is as low as 0.1% by weight, or even less. When the ammonia is added in the form of an aqueous solution of ammonia, it is preferred to employ it in concentrated solutions (e. g. solutions containing about 30% ammonia). However, dilute aqueous solutions of ammonia may also be used.

The recovery of the readily polymerizable unsaturated ketone from the stable composition of matter produced in accordance with the present invention may be effected relatively simply by subjecting the stable mixture to a fractional distillation. When anhydrous ammonia is employed as the stabilizing agent, such a distillation results in the formation of an overhead fraction consisting of the unsaturated ketone in a pure, water-white and readily polymerizable form. If, however, an aqueous ammonia solution is used as the stabilizer, the fractional distillation of the resulting stable composition of matter first forms a ketone-water azeotrope followed by an overhead fraction consisting of the pure and readily polymerizable ketone. The azeotrope may be dehydrated by any known means, for example, by treating it with calcium chloride or some other dehydrating agent, and by re-distilling. In both cases, there is no ammonia in the overhead condensed fraction. In order to prevent oxidation of the ketone during the ketone recovery step, it is desirable to effect the distillation in an atmosphere of an inert gas, such as nitrogen. Other methods of recovering the readily polymerizable ketone from the ammonia-containing stable mixtures may be used. For example, the stable composition of matter may be treated with anhydrous cupric sulfate, followed by a distillation of the resulting mixture to recover the pure unsaturated ketone as an overhead fraction.

The addition of the ammonia in any suitable form, besides stablizing the unsaturated ketones against any undesirable polymerization during storage and/or shipping, has a further advantage. It is known that ketones, and particularly the unsaturated ketones, acquire an undesirable color upon standing. This color, which is usually yellow, is believed to be due to the presence of small amounts of colored impurities which are thought to be diketones formed as a result of an oxidation. The colored impurities appear to have approximately the same boiling temperature as the ketones from which they are derived, and they have a very high coloring power, so that ordinary fractional distillation is ineffective to free the ketones of coloring matter and to render them water-white. The presence of color-imparting impurities in the unsaturated ketones is highly undesirable because, during the polymerization of such impure ketones, the impurities tend to promote the formation of undesirable by-products and to produce a final product which is also discolored. When, however, a discolored unsaturated ketone containing a stabilizing amount of ammonia is subjected to a fractional distillation to recover the ketone in a readily polymerizable state, the overhead fraction is substantially water-white, the impurities remaining in the relatively small residue in the still.

The following examples are given for the purpose of illustrating a few details of the process.

Example I

Methyl isopropenyl ketone was mixed with about 1% by volume of a concentrated aqueous solution of ammonia, the ammonia concentration of which was about 28% by weight. The mixture was then allowed to stand for about six months. During the day the mixture was exposed to diffused daylight. At the end of the six-month period there was no noticeable increase in the viscosity of the monomer although it had a yellow color. On the other hand, when methyl isopropenyl ketone which did not contain any ammonia was stored under the same conditions, a hard resinous matter was obtained at the end of about 2½ months.

Example II

Approximately 20 cc. of concentrated aqueous solution of ammonia was added to about 555 grams of methyl isopropenyl ketone, and the two substances were mixed together. After standing for a long period of time without showing any tendency to polymerize, the mixture (which had a yellow color) was subjected to a distillation in an atmosphere of nitrogen. At the beginning of this distillation, a colorless fraction boiling at about 75.4° C. was collected as the overhead condensate. This fraction, which consisted of the ketone-water azeotrope, was treated with calcium chloride and re-distilled to obtain pure anhydrous methyl isopropenyl ketone. After the separation of the azetrope, the bulk of the methyl isopropenyl ketone was obtained as an overhead fraction which was colorless, boiled between about 97.1° C. and about 97.6° C., and had a refractive index $n^{20}_D = 1.4233$. It analyzed as pure methyl isopropenyl ketone monomer, and, when irradiated with ultra-violet light, readily polymerized to a hard resin.

When a similarly colored sample of methyl isopropenyl ketone which did not contain any ammonia was distilled under the same conditions as those described above, the distillate remained yellow and did not polymerize readily when irradiated with ultra-violet light.

Example III

Methyl isopropenyl ketone was mixed with a concentrated aqueous solution of ammonia. The mixture contained slightly more than 1% by weight of ammonia, and was allowed to stand for about 23 days. Thereafter the mixture was subjected for 24 hours to the influence of ultraviolet light from a quartz mercury vapor lamp. At the end of this period there was no noticeable increase in the viscosity of the monomer.

*Example IV*

Methyl isopropenyl ketone was mixed with about 3/4% by weight of liquid ammonia and allowed to stand for 33 days. An analysis of the product showed that there was practically no polymerization. The mixture was then treated with cupric sulfate and distilled, the distillate (which was now free from ammonia) being then again stored for about 39 days. In both cases of storage the ketone sample was not shielded from diffused daylight. During the second storage the refractive index rose from 1.4296 to 1.4426, thus indicating considerable polymerization. After further standing this ketone polymerized to a hard resin.

Although the invention has been described in the above examples with particular reference to mthyl isopropenyl ketone, it is to be understood that other unsaturated ketones of the above-defined class may also be stabilized against undesirable polymerization by the addition thereto of at least a stabilizing amount of ammonia, and that these ketones may later be recovered from the stable mixtures in a pure, colorless and readily polymerizable form.

We claim as our invention:

1. Stabilized methyl isopropenyl ketone containing between about 0.1% and about 2.0% by weight of ammonia.

2. Methyl isopropenyl ketone stabilized with from about 0.1% to about 5% by weight of ammonia.

3. Methyl isopropenyl ketone stabilized with from about 0.1% to 5% by weight of ammonia in the form of an aqueous ammonia solution having a concentration of about 30%.

4. An alkyl isopropenyl ketone stabilized with from about 0.1% to about 5% by weight of ammonia.

5. A composition of matter stabilized against polymerization which comprises a normally liquid, readily polymerizable aliphatic alpha-beta unsaturated ketone containing an unsaturated tertiary alpha carbon atom directly attached to a terminal methylene group, and from about 0.1% to about 5% by weight of ammonia.

6. A composition of matter stabilized against polymerization which comprises a normally liquid, readily polymerizable alpha-beta unsaturated ketone containing an unsaturated tertiary alpha carbon atom directly attached to a terminal methylene group, and from about 0.1% to about 5% by weight of ammonia.

7. A composition of matter stabilized against polymerization which comprises a normally liquid, readily polymerizable aliphatic unsaturated ketone having an alkylene group containing at least three carbon atoms attached directly to the carbonyl group, said alkylene group having a terminal methylene radical, and from about 0.1% to about 5% by weight of ammonia.

8. A composition of matter stabilized against polymerization which comprises a normally liquid, readily polymerizable unsaturated ketone having an unsaturated group containing at least three carbon atoms attached to the carbonyl group, said unsaturated group having a terminal methylene group, and from about 0.1% to about 5% by weight of ammonia.

9. A process for inhibiting undesirable polymerization of methyl isopropenyl ketone which comprises mixing with the ketone from about 0.1% to about 5% by weight of ammonia in the form of an aqueous ammonia solution having a concentration of about 30%.

10. A process for inhibiting undesirable polymerization of methyl isopropenyl ketone which comprises dissolving therein between about 0.1% and about 2.0% by weight of ammonia.

11. A process for inhibiting undesirable polymerization of an alkyl isopropenyl ketone which comprises mixing therewith from about 0.1% to about 5% by weight of ammonia.

12. A process for inhibiting undesirable polymerization of a normally liquid, readily polymerizable aliphatic alpha-beta unsaturated ketone containing an unsaturated tertiary alpha carbon atom directly attached to a terminal methylene group, which comprises mixing with the ketone from about 0.1% to about 5% by weight of ammonia.

13. A process for inhibiting undesirable polymerization of a normally liquid, readily polymerizable aliphatic unsaturated ketone having an alkylene group containing at least three carbon atoms attached directly to the carbonyl group, said alkylene group having a terminal methylene radical, which comprises mixing with the ketone from about 0.1% to about 5% by weight of ammonia.

14. A process for inhibiting undesirable polymerization of a normally liquid, readily polymerizable unsaturated ketone having an unsaturated group containing at least three carbon atoms attached to the carbonyl group, said unsaturated group having a terminal methylene group, which comprises mixing with the ketone from about 0.1% to about 5% by weight of ammonia.

15. A method for inhibiting undesirable polymerization of monomeric methyl isopropenyl ketone and for the subsequent recovery thereof in a pure and readily polymerizable state, which comprises mixing methyl isopropenyl ketone with from about 0.1% to about 5% by weight of ammonia to inhibit its polymerization under storage conditions, and subsequently subjecting the mixture to distillation to recover pure, substantially water-white and readily polymerizable monomeric methyl isopropenyl ketone.

16. A method for inhibiting undesirable polymerization of a readily polymerizable unsaturated ketone and for the subsequent recovery thereof in a pure and readily polymerizable state, which comprises mixing a normally liquid, readily polymerizable ketone having an unsaturated group containing at least three carbon atoms attached to the carbonyl group, said unsaturated group having a terminal methylene radical, with from about 0.1% to about 5% by weight of ammonia to inhibit undesirable polymerization of the ketone, and subsequently recovering the ketone in a pure and readily polymerizable state from said mixture.

HANS DANNENBERG.
DAVID E. ADELSON.